United States Patent [19]
Patel

[11] Patent Number: 5,940,622
[45] Date of Patent: Aug. 17, 1999

[54] SYSTEMS AND METHODS FOR CODE REPLICATING FOR OPTIMIZED EXECUTION TIME

[75] Inventor: Burzin A. Patel, Columbia, S.C.

[73] Assignee: NCR Corporation, Dayton, Ohio

[21] Appl. No.: 08/763,650

[22] Filed: Dec. 11, 1996

[51] Int. Cl.[6] .................................................. G06F 9/45
[52] U.S. Cl. ..................... 395/709; 395/704; 395/705; 395/708
[58] Field of Search .................................. 395/580–581, 395/586, 588, 568, 564, 704, 705, 708, 709, 800.24, 898

[56] References Cited

U.S. PATENT DOCUMENTS

| | | | |
|---|---|---|---|
| 5,222,235 | 6/1993 | Hintz et al. | 707/101 |
| 5,307,478 | 4/1994 | Rasbold et al. | 395/500 |
| 5,329,630 | 7/1994 | Baldwin | 711/173 |
| 5,363,490 | 11/1994 | Alferness et al. | 395/581 |
| 5,452,457 | 9/1995 | Alpert et al. | 395/700 |
| 5,544,342 | 8/1996 | Dean | 711/119 |
| 5,689,672 | 11/1997 | Witt et al. | 395/389 |
| 5,751,982 | 5/1998 | Morley | 395/385 |

*Primary Examiner*—James P. Trammell
*Assistant Examiner*—Cuong H. Nguyen
*Attorney, Agent, or Firm*—William A. Munck

[57] ABSTRACT

An optimizer that reduces execution time of computer code and a system and method that optimizes an execution time for a sequence of instruction blocks in a processor. The optimizer includes: (1) a parsing routine that scans the computer code to identify a conditional branching instruction that leads to execution being diverted from a main execution stream into a branch execution stream in which computer code is executed non-sequentially and (2) a code replication routine that inserts instructions into the branch execution stream to reduce non-sequential code execution.

17 Claims, 4 Drawing Sheets

SYSTEMS AND METHODS FOR CODE REPLICATING FOR OPTIMIZED EXECUTION TIME

TECHNICAL FIELD OF THE INVENTION

The present invention is directed, in general, to computer systems and, more specifically, to systems and methods for reordering and cloning code for optimized execution.

BACKGROUND OF THE INVENTION

Computers function by operating on data in accordance with executed instructions. In traditional computer architectures, instructions to be executed are loaded from particular locations in the computer's memory to the computer's central processing unit ("CPU") in a sequence in part determined by the instructions themselves. Unless otherwise directed, the CPU steps through the memory locations in order, executing instructions located in subsequent contiguous locations one after another.

However, certain instructions can cause the CPU to redirect execution to a non-contiguous location determined by the instruction. These "branch" instructions may be conditional or unconditional. In advanced processing units, including those that contain instruction "pipelines," the processor can calculate the target address of an unconditional branch instruction, initiate pre-fetching of the target instruction and continue to fill the pipeline.

Conditional branching is more complicated. A conditional branch is only taken if a specified condition is satisfied, then program execution branches to a non-contiguous location. If the condition is not satisfied, then program execution flow simply "falls through" to the next instruction.

An example of a branch instruction is the assembly language level "jump" instruction. Jump instructions allow the CPU to skip from location to location within the computer's memory, executing instructions at those locations and lending a degree of programming freedom. Jump instructions include an operand designating a location to which to jump. As mentioned above, jumps can be unconditional or conditioned on the existence of a particular state within the computer (i.e., conditional branching).

A conditional jump instruction not only includes an operand designating the location to which to jump but also includes a designation of the state to monitor to determine whether the jump should be taken. This designation is typically made part of the instruction operator. Thus, the general form for a jump instruction in assembly language is "Jxx yyyyy", where "xx" is the state designation and "yyyyy" is the location in memory to which to jump if xx is satisfied. Additionally, "yyyyy" may be a label instead of an actual location in memory.

Non-sequential execution of code is less desirable than sequential execution. This is because branching instructions, particularly conditional branching instructions, require more processor time to obtain and jump to the next non-sequential instruction than is required by a program instruction which simply "falls through" to the next sequential instruction. This is also true of a conditional branching instruction where the condition is not satisfied and the branch is not taken. In such a case, program flow falls through to the next sequential instruction after the conditional branch instruction.

Sequential instructions, including conditional branches where the condition is not met, execute faster because the processor needs only to increment its internal program counter in order to obtain the address of the next instruction. In the case of non-sequential execution, including conditional branches where the branch condition is met, the program must first fetch the target address of the next address and then jump to the target address to obtain the next instruction.

Accordingly there is a need in the art for methods of minimizing the number of branch instructions in a program and, in particular, for methods of organizing and selecting instructions in a manner that minimizes the number of times in which execution of a conditional branch results in non-sequential code execution. There is a further need in the art for code optimizers and compilers that can reorder and modify instructions in order to eliminate or minimize non-sequential "taken" branches during program execution.

SUMMARY OF THE INVENTION

To address the above-discussed deficiencies of the prior art, the present invention provides an optimizer that reduces execution time of computer code and a system and method that optimizes an execution time for a sequence of instruction blocks in a processor. The optimizer includes: (1) a parsing routine that scans the computer code to identify a conditional branching instruction that leads to execution being diverted from a main execution stream into a branch execution stream in which computer code is executed non-sequentially and (2) a code replication routine that inserts instructions into the branch execution stream to reduce non-sequential code execution.

The present invention therefore introduces the broad concept that code may be advantageously replicated to increase its execution speed. Essentially, the execution speed is increased by reducing the amount of out-of-order processing (conditional jumps and calls) that the code requires. As described above, the prior art has recognized that code may be reordered to reduce out-of-order processing, but that reordering never resulted in code being replicated. Of course, code may be both reordered and replicated to advantage.

The present invention, as described above, operates as an "optimizer" in that it parses code and replicates as desired. It need not change the form of the code (such as occurs in a compiler or assembler). However, the optimizer of the present invention may be made a part of a compiler or assembler, thereby providing a single process for converting and optimizing code.

In one embodiment of the present invention, the code replication routine inserts the instructions only when a probability of the branch execution stream being taken exceeds a lower threshold value. This embodiment of the present invention recognizes that a tradeoff exists between code length and execution time. Thus, it may not be optimal to replicate code wherever possible. When a particular branch execution stream is rarely taken, the replicated code therein is rarely used and therefore represents an addition to overall code length that produces little marginal benefit to code execution time. This embodiment therefore opts not to replicate when the chances of a branch execution stream being taken are less than the lower threshold value. The lower may be fixed or may be user-selectable.

In one embodiment of the present invention, the code replication routine replicates the instructions from the main execution stream. Alternatively, the code replication routine may replicate instructions from another branch execution stream (such as when branches contain subbranches).

In one embodiment of the present invention, the instructions inserted into the branch execution stream avoid convergence of the branch execution stream back into the main execution stream. "Convergence" occurs when branches use common code or instructions. Convergence usually requires out-of-order processing. Therefore, to avoid such out-of-order processing, this embodiment of the present invention replicates the common code into each branch that uses it, thereby avoiding the out-of-order processing encountered in convergence.

In one embodiment of the present invention, the optimizer optimizes the computer code until the computer code attains a user-selectable maximum code length. As described above, a tradeoff may exist between code length and execution time. One embodiment described above introduces a lower threshold value to limit replication. This embodiment, in contrast, allows a user to determine how much replication is to occur by instructing the optimizer that the code is not to be lengthened beyond the selectable maximum code length. For example, a user may wish to optimize code by replication, but not such that the code will exceed 64K in length. The optimizer of this embodiment can prioritize the possible replications, opting to replicate only when the maximum code length the user has selected is not exceeded.

In one embodiment of the present invention, the optimizer iteratively executes the code with different combinations of replications. This allows the optimizer to provide data, possibly in graphical form, that allows the user to see the relationship between code length and execution time. This allows the user the unique power to judge to what extent he is willing to accept an increase in code length to gain the benefit of shorter execution time.

In one embodiment of the present invention, a nonvolatile storage medium has the optimizer contained therein. The nonvolatile medium may be a floppy, hard or optical disk or may be tape, paper or the like. Of course the optimizer may be held temporarily in volatile memory for execution thereof.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
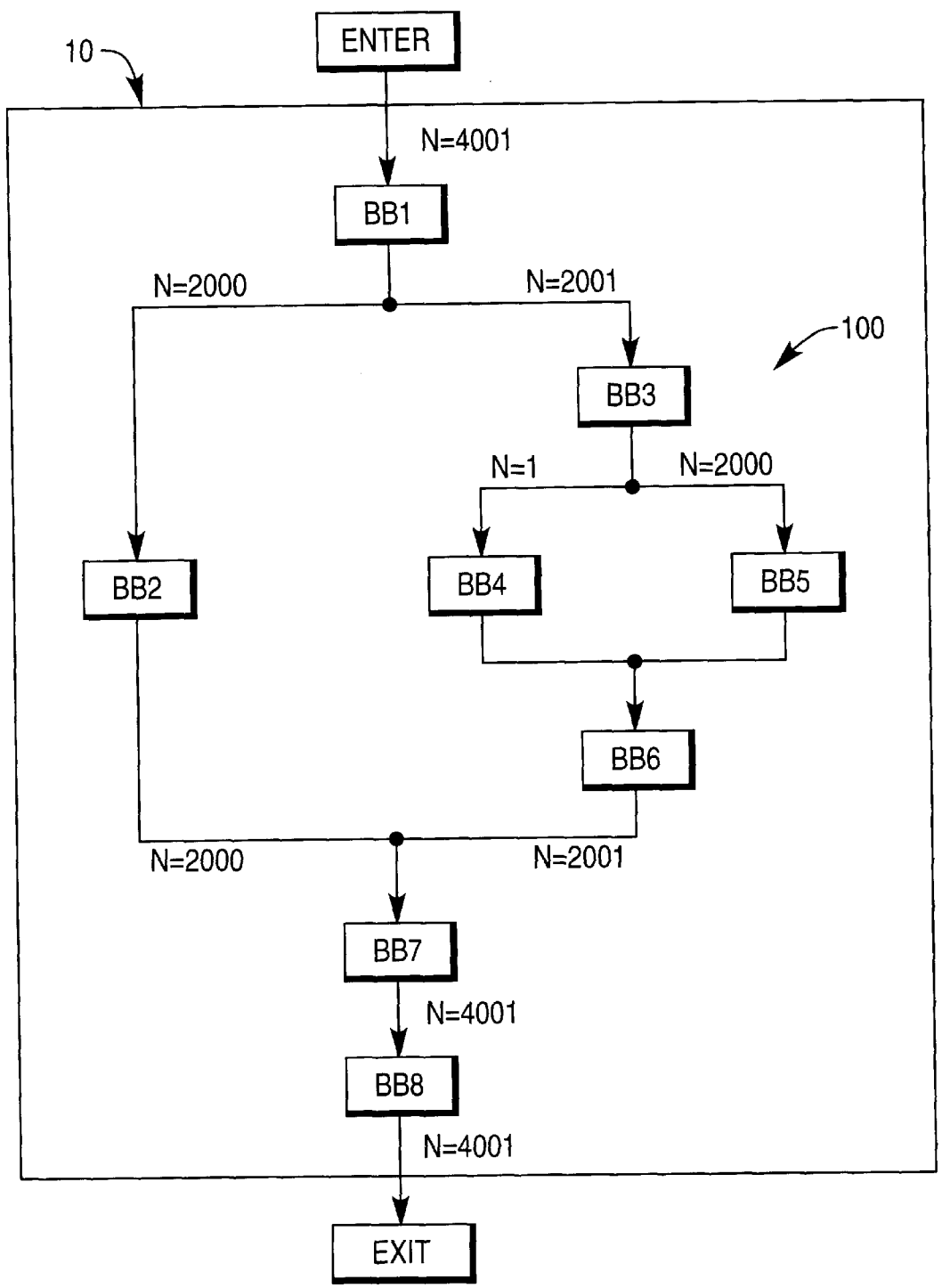
FIG. 1 illustrates an exemplary flow chart showing program flow between blocks of code and the relative frequency of "taken" conditional branches therein.

Referring initially to FIG. 1, illustrated is an exemplary flow chart (generally designated 100) showing program flow between blocks of code in an exemplary computer 10 and the relative frequency of "taken" conditional branches therein. Flow chart 100 illustrates the flow of program control among eight basic blocks of code, labeled BB1–BB8, in a program routine FUNC( ). The arrows between blocks BB1 through BB8 represent transition paths of program execution from one basic block to another. The numbers next to the arrows indicated the number of times each path was taken during a specified number of executions of routine FUNC ( ). In a sample test of four thousand and one (N=4001) executions of the routine, control was transferred from basic block BB1 to BB3 two thousand and one (N=2001) times and from BB1 to BB2 two thousand times. Similarly, control was transferred from BB3 to BB5 two thousand times and from BB3 to BB4 once.

Computer 10 may be any suitably arranged computer including micro-, personal, mini-, mainframe or supper computers, as well as network combinations of some of the same. In point of fact, the principles of the present invention may be implemented alternatively in any appropriately arranged device having processing circuitry. Processing circuitry may include one or more conventional processors, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuits, controllers and systems described and claimed herein.

Conventional computer system architecture is more fully discussed in *The Indispensable PC Hardware Book,* by Hans-Peter Messmer, Addison Wesley (2nd ed. 1995) and *Computer Organization and Architecture,* by William Stallings, MacMillan Publishing Co. (3rd ed. 1993); conventional computer, or communications, network design is more fully discussed in *Data Network Design,* by Darren L. Spohn, McGraw-Hill, Inc. (1993); conventional data communications is more fully discussed in *Voice and Data Communications Handbook,* by Bud Bates and Donald Gregory, McGraw-Hill, Inc. (1996), *Data Communications Principles,* by R. D. Gitlin, J. F. Hayes and S. B. Weinstein, Plenum Press (1992) and The Irwin *Handbook of Telecommunications,* by James Harry Green, Irwin Professional Publishing (2nd ed. 1992); and conventional circuit design is more fully discussed in *The Art of Electronics,* by Paul Horowitz and Winfield, Cambridge University Press (2nd ed. 1991). Each of the foregoing publications is incorporated herein by reference for all purposes.

Figure 2:
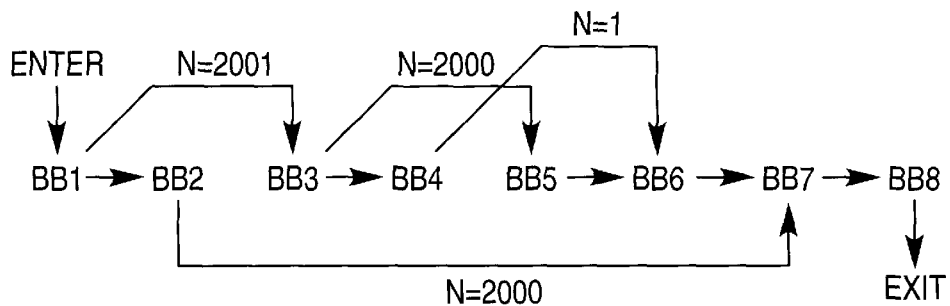
FIG. 2 illustrates an exemplary sequentially-ordered representation of the blocks of code in FIG. 1 depicting conditional branching in program flow in accordance with PRIOR ART techniques.

Turning now to FIG. 2, illustrated is an exemplary sequentially-ordered representation of the basic blocks BB1–BB8 of code in FIG. 1 depicting conditional branching in program flow in accordance with PRIOR ART techniques. This is the form in which the routine FUNC( ) is originally written. The labeled arrows indicate the "taken" branches in the flow of the routine FUNC( ) that result in non-sequential branching in program execution. The short arrows connecting blocks BB1 through BB8 represent sequential transitions from one block of code to the next. As FIG. 2 shows, the 4001 runs of FUNC ( ) contain 6002 non-sequential branches. The relatively large number of non-sequential branches greatly increases execution time.

Numerous PRIOR ART methods have been demonstrated to optimize the performance of computer programs. U.S. Pat. No. 5,307,478 to Rasbold et al. and U.S. Pat. No. 5,452,457 to Alpert et al. disclose systems and methods for optimizing the execution of assembled code. The teachings disclosed in U.S. Pat. Nos. 5,307,478 and 5,452,457 are hereby incorporated into the present disclosure as if fully set forth herein.

Figure 3:
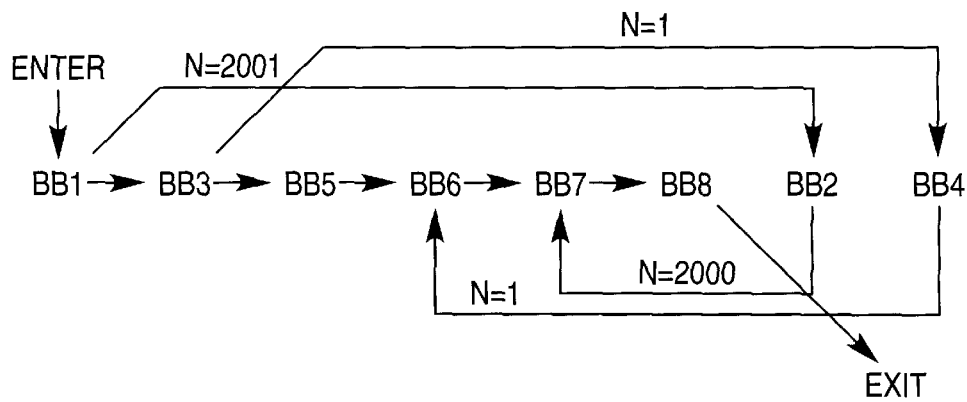
FIG. 3 illustrates an exemplary reordered sequence of the blocks of code in FIG. 2 depicting reduced conditional branching in program flow in accordance with PRIOR ART techniques.

Turning now to FIG. 3, illustrated is an exemplary reordered sequence of the blocks of code in FIG. 2 depicting reduced conditional branching in program flow in accordance with another PRIOR ART technique. The performance of routine FUNC( ) can be improved by reordering the sequence of blocks BB1–BB8 so as to minimize non-sequential jumps between blocks. One common method organizes the blocks in "traces" according to probability of execution according to the following algorithm:

1) Mark blocks BB1–BB8 in routine FUNC( ) as UNVISITED.
2) Select a trace selection threshold (e.g., 20%).
3) Select a start basic block with the highest execution count (e.g., BB3).
4) Move the trace forward. For each successor block of the start block:
   a) Determine the next successor block in the trace with the highest execution count (greater than the threshold count) that has not been visited and has the current basic block as its predecessor with the highest execution count.
   b) Mark the next successor block VISITED.
   c) Select the next successor block as the next block in the trace.
5) Make the next successor block the current block and repeat the above step.
6) Grow the trace backward. For each predecessor block of the original basic block:
   a) Determine the predecessor block with the highest execution count (greater that the trace selection threshold) that has not been visited and has the current basic block as the predecessor with the highest execution count.
   b) Mark the predecessor block VISITED.
   c) Select the predecessor block as the next block in the trace.
7) Make the predecessor block the current block and repeat the preceding above step.

Once the traces are formed, they are ordered so as to maximize sequential transitions between the traces.

Applying this algorithm to the routine FUNC( ) in FIG. 1, a sequential trace is formed from BB1 as grown as: BB1-BB3-BB5-BB6-BB7-BB8. Once this is done, the next block with the highest execution count that has not been VISITED is chosen, namely BB2. However, since BB2 transitions to BB7 and BB7 has been VISITED, a sequential trace cannot be extended from BB2. Hence, the trace ends at BB2. Similarly, BB4 also forms a single block trace.

This algorithm yields the reordered sequence of basic blocks shown in FIG. 3 wherein the code of FUNC( ) has been reordered so that BB2 follows BB8 and BB4 follows BB2. Execution now flows sequentially from BB1 to BB3 and from BB3 to BB5. In sum, 2000 non-sequential jump branches have been eliminated from the original sequence shown in FIG. 2. The reordering thus lowers non-sequential branching to 4002, a 33% reduction.

Figure 4:
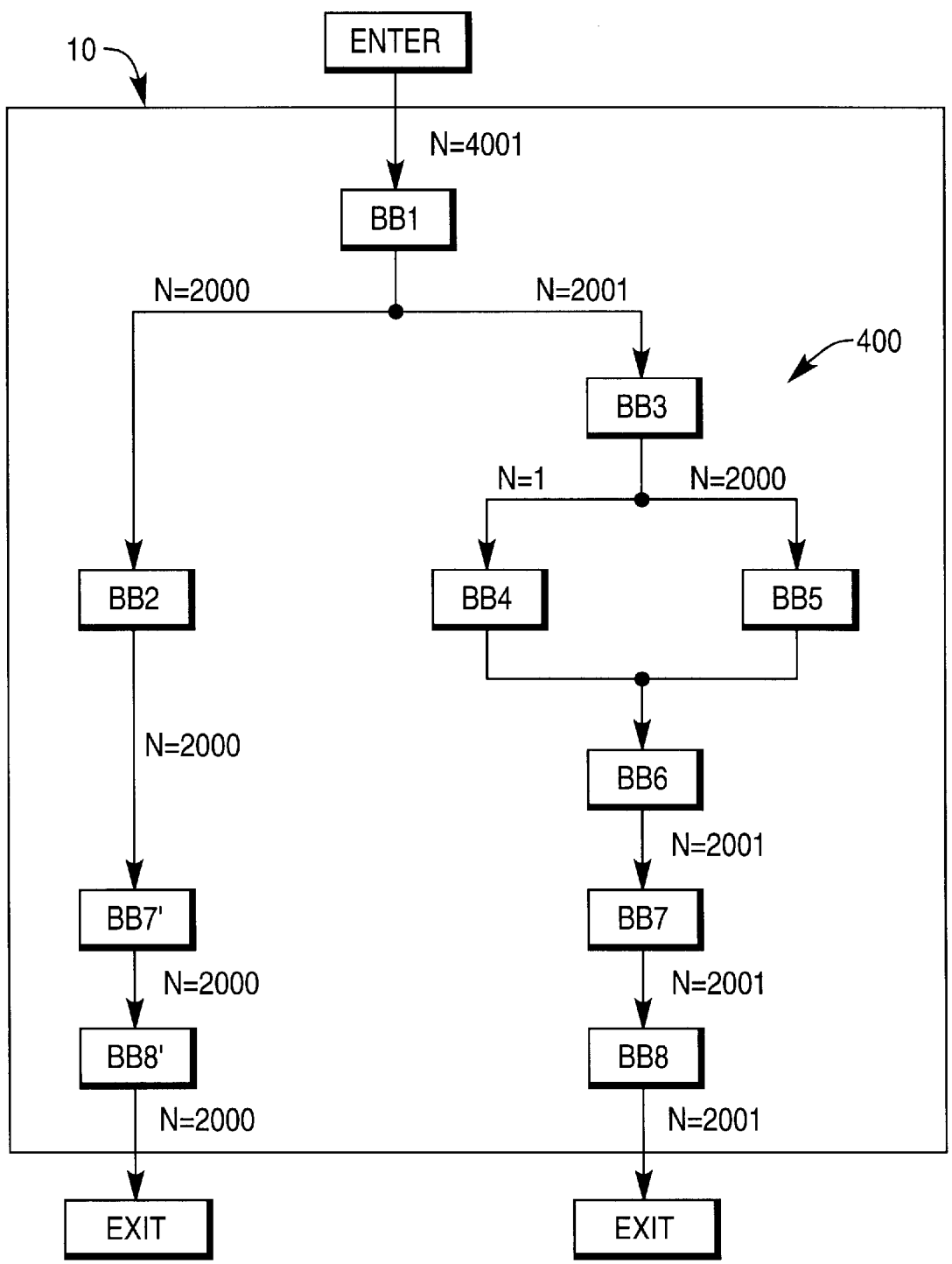
FIG. 4 illustrates an exemplary flow chart showing program flow between blocks of code that have been cloned and re-ordered in accordance with the principles of the present invention.

Turning now to FIG. 4, illustrated is an exemplary flow chart (generally designated 400) showing program flow between blocks of code in exemplary computer 10 that have been cloned and re-ordered in accordance with the principles of the present invention. The above PRIOR ART method of optimizing execution is further enhanced by a compiler, or a code optimization routine, in accordance with the present invention. The improved compiler includes a parsing routine that scans computer code to detect conditional branch instructions and a code replication routine that replicates (or clones) sections of the code and inserts the replicated code into the original code in order to minimize non-sequential transitions during execution.

Although the present invention is described as being implemented in a compiler, it should be understood by those skilled in the art that the present invention may be embodied in other types of code analyzing and/or parsing routines in addition to compilers, or alternatively in hardware or firmware.

A compiler in accordance with the present invention forms traces, the present invention however replicates sections of code that were marked VISITED in the PRIOR ART algorithm and re-inserts them into the sequence in order to further reduce non-sequential branching. For example, in the code sequences in FIGS. 1 and 3, the sequential trace from basic block BB2 could not be extended to BB7 because BB7 had already been marked VISITED (i.e., BB7 was already part of a sequential trace that included BB3). The present invention clones basic blocks BB7 and BB8 and creates new bocks BB7' and BB8' that are then placed in sequence after block BB2. Once accomplished, flow diagram 100 is transformed into flow diagram 400, illustrating program flow between blocks of code that have been cloned and reordered in accordance with the present invention. The flow of program control from BB2 to BB7' and BB8' takes place sequentially, thereby eliminating the non-sequential merge from BB2 to BB7 in flow diagram 100. This method of cloning code to eliminate non-sequential transitions may be applied to both conditional and unconditional branch instructions.

As set forth hereinabove, the present invention introduces the broad concept that code may be advantageously replicated to increase its execution speed. The execution speed is essentially increased by reducing the amount of out-of-order processing (conditional jumps and calls) that the code requires. As described above, the prior art has recognized that code may be reordered to reduce out-of-order processing, but that reordering never resulted in code being replicated. Of course, code may be both reordered and replicated to advantage.

Figure 5:
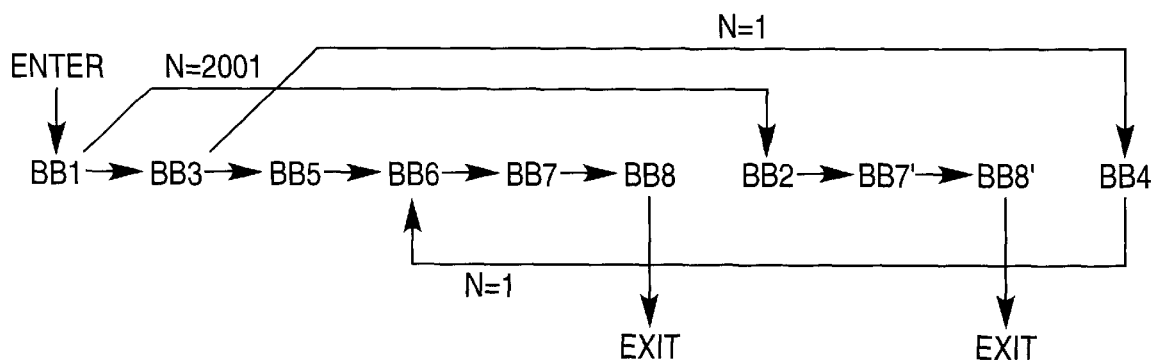
FIG. 5 illustrates an exemplary reordered sequence of the blocks of code in FIG. 2 depicting reduced conditional branching in program flow in accordance with the principles of the present invention.

Turning now to FIG. 5, illustrated is an exemplary reordered sequence of the blocks of code in FIG. 2 depicting reduced conditional branching in program flow in accordance with the principles of the present invention. Illustrated is a reordered sequence of the blocks of code of the routine FUNC( ) after one or more sections of code have been cloned in accordance with exemplary flow diagram 400. The "branch back" in FIG. 3 from BB2 to BB7 has been eliminated, thereby eliminating 2000 non-sequential jump branches. The reordered sequence in FIG. 5 lowers non-sequential branching to 2002, a 66% reduction over that illustrated in FIG. 2.

In a preferred embodiment of the present invention, a basic block of code is replicated by the compiler if it is frequently executed, such as if the frequency of execution exceeds a trace selection threshold, for example. The present invention strikes a balance between the performance gained by reducing the number of non-sequential branches and the performance lost by duplicating the original basic blocks, which increases the overall code size and thereby increases bus utilization and cache thrashing. Code may be replicated according to different criteria. A threshold level may be established by the user for all traces in order to determine whether a section of code will be cloned by the code optimizer. The user may then adjust the threshold level upwards or downwards, depending on the maximum acceptable size of the cloned code after optimization. Alternatively, the user may simply set an upper limit on the size of the cloned code after optimization and allow the compiler to establish the lowest possible trace threshold level that still keeps the size of the cloned code at or below the upper limit set by the user.

Figure 6:
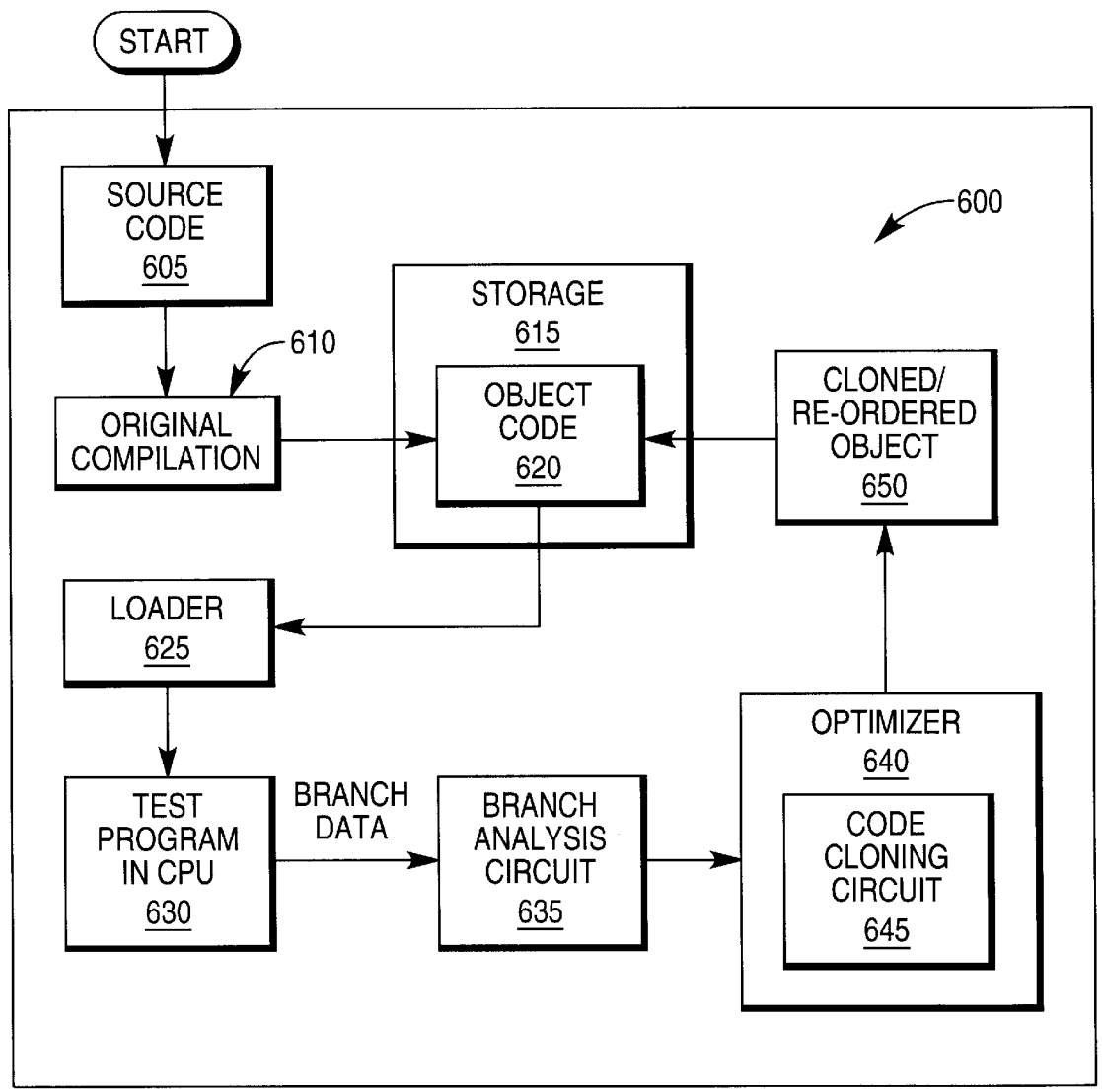
FIG. 6 illustrates an exemplary system and method for cloning and re-ordering code in accordance with the principles of the present invention.

Turning now to FIG. 6, illustrated is an exemplary method (generally designated 600) for cloning and re-ordering code in computer 10 in accordance with the principles of the present invention. Depicted is an embodiment for limited cloning and re-ordering of a program. The user writes source code 605 for a program in a desired preliminary sequence, for example, basic blocks BB1 through BB8. Source code 605 undergoes an initial compilation step 610 to produce an initial object code 620 that is stored in storage device 615. Object code 620 is transferred to loader 625 and is inserted into RAM memory as a test program 630 for execution by the CPU of computer 10. As test program 630 is repeatedly executed, branch analysis circuit 635 analyzes each instruction executed by the CPU, determines which are branch instructions, flags the non-sequential jumps executed by test program 630, and compiles statistics for test program 630, such as the number of unconditional jumps, the number of conditional jumps, and the frequency of non-sequential jumps taken by test program 630 at each conditional branch instruction whenever the branch condition is met.

The branch instruction statistics are transferred to optimizer 640, which includes code cloning circuit 645. Optimizer 640 determines which branch instructions take non-sequential jumps in excess of the trace threshold frequency established by the user for test program 630. If an instruction exceeds the threshold level, code cloning circuit 645 will replicate the non-sequential target section of code to which the instruction branches and insert the cloned copy sequentially after the branch instruction. If the branch instruction was unconditional, it may be deleted altogether. If the branch instruction was conditional, optimizer 640 modifies the branch instruction so that program execution "falls through" if the branch condition is met, rather than jumping out of sequence. Target addresses in the cloned code and in the rest of test program 630 then must be resolved in accordance with the cloned codes new location in test program 630. The cloned/re-ordered object code 650 is then transferred to storage device 615 to replace the original object code 620. In a preferred embodiment, the above process is run iteratively, so that cloned/reordered object code 650 is loaded into memory and executed by the CPU. Branch analysis circuit 635 may then compile new statistics for further refinement and optimization of the program.

In a further refinement of the above described method, system 600 may clone and re-order code based on statistical estimates by the user. For example, after the user has written and de-bugged source program 605 and original object code 620 has been compiled, the user may assign estimated frequencies to the target addresses associated with one or more branch instructions in the program. The estimated frequencies may be based on statistics associated with input data being processed by basic blocks BB1–BB8 of the routine FUNC( ), or may simply be the user's best guess. These estimated frequencies substitute for the actual branch statistics gathered by branch analysis circuit 635. Optimizer 640 then uses the estimated frequencies supplied by the user to clone and re-order the code as before.

From the above, it is apparent that the present invention provides an optimizer that reduces execution time of computer code and a system and method that optimizes an execution time for a sequence of instruction blocks in a processor. The optimizer includes: (1) a parsing routine that scans the computer code to identify a conditional branching instruction that leads to execution being diverted from a main execution stream into a branch execution stream in which computer code is executed non-sequentially and (2) a code replication routine that inserts instructions into the branch execution stream to reduce non-sequential code execution.

Although the present invention has been described in detail, those skilled in the art should understand that they can make various changes, substitutions and alterations herein without departing from the spirit and scope of the invention in its broadest form.

What is claimed is:

1. A device that reduces execution time of computer code, comprising:
    an optimizer that scans said computer code to identify a conditional branching instruction that leads to execution being diverted from a main execution stream into a branch execution stream in which computer code is executed non-sequentially; and
    a code cloning circuit that inserts instructions into said branch execution stream to reduce non-sequential code execution; and
    wherein said optimizer optimizes said computer code until said computer code attains a user-selectable maximum code length.

2. The device as recited in claim 1 wherein said code cloning circuit inserts said instructions only when a probability of said branch execution stream being taken exceeds a predetermined lower threshold value.

3. The device as recited in claim 1 wherein said code replication routine replicates said instructions from said main execution stream.

4. The device as recited in claim 1 wherein said instructions inserted into said branch execution stream avoid convergence of said branch execution stream back into said main execution stream.

5. The device as recited in claim 1 further comprising a nonvolatile storage medium having the optimizer contained therein.

6. For use in a processing device, a method of optimizing an execution time for a sequence of instruction blocks executed by the processing device, comprising the steps of:
    analyzing said sequence to identify which of said instruction blocks conditionally require said processor to undertake out-of-sequence processing;
    replicating other instruction blocks in said sequence to reduce said out-of-sequence processing and thereby increase sequential processing of said instruction blocks; and
    optimizing said sequence until said sequence attains a user-selectable maximum sequence length.

7. For use in a processing device, a method of optimizing an execution time for a sequence of instruction blocks executed by the processing device, comprising the steps of:

analyzing said sequence to identify which of said instruction blocks conditionally require said processor to undertake out-of-sequence processing; and replicating other instruction blocks in said sequence to reduce said out-of-sequence processing and thereby increase sequential processing of said instruction blocks; and wherein said instruction blocks that conditionally require said processing device to undertake said out-of-sequence processing create branches in said sequence, said other instruction blocks occurring at convergences of said branches.

8. The method as recited in claim 7 wherein said step of replicating comprises the step of replicating said other instruction blocks only when a probability of said out-of-sequence processing exceeds a predetermined lower threshold value.

9. The method as recited in claim 7 wherein some of said other instruction blocks occur sequentially after said instruction blocks that conditionally require said processing device to undertake said out-of-sequence processing.

10. The method as recited in claim 7 wherein said method is carried out by executing a sequence of software instructions.

11. The method as recited in claim 7 wherein each of said instruction blocks comprises a plurality of computer instructions.

12. A system that optimizes an execution time for a sequence of instruction blocks in a processor, comprising:

an instruction analysis circuit that analyzes said sequence to identify which of said instruction blocks conditionally require said processor to undertake out-of-sequence processing; and an instruction replication circuit that replicates other instruction blocks in said sequence to reduce said out-of-sequence processing and thereby increase sequential processing of said instruction blocks; and wherein said system optimizes said sequence until said sequence attains a user-selectable maximum sequence length.

13. A system that optimizes an execution time for a sequence of instruction blocks in a processor, comprising:

an instruction analysis circuit that analyzes said sequence to identify which of said instruction blocks conditionally require said processor to undertake out-of-sequence processing; and an instruction replication circuit that replicates other instruction blocks in said sequence to reduce said out-of-sequence processing and thereby increase sequential processing of said instruction blocks; and wherein said instruction blocks that conditionally require said processor to undertake said out-of-sequence processing create branches in said sequence, said other instruction blocks occurring at convergences of said branches.

14. The system as recited in claim 13 wherein said instruction analysis and instruction replication circuits are embodied in a sequence of software instructions.

15. The system as recited in claim 13 wherein said instruction replication circuit replicates said other instruction blocks only when a probability of said out-of-sequence processing exceeds a predetermined lower threshold value.

16. The system as recited in claim 13 wherein some of said other instruction blocks occur sequentially after said instruction blocks that conditionally require said processor to undertake said out-of-sequence processing.

17. The system as recited in claim 13 wherein each of said instruction blocks comprises a plurality of computer instructions.

* * * * *